(12) United States Patent
Griffin et al.

(10) Patent No.: US 11,848,857 B1
(45) Date of Patent: Dec. 19, 2023

(54) DYNAMIC API GATEWAY ROUTING BASED ON REQUEST METADATA

(71) Applicant: Red Hat, Inc., Raleigh, NC (US)

(72) Inventors: Leigh Griffin, Waterford (IE); Pierre-Yves Chibon, Saint-Pol-de-Leon (FR)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 17/861,536

(22) Filed: Jul. 11, 2022

(51) Int. Cl.
G06F 15/16 (2006.01)
H04L 45/12 (2022.01)
H04L 67/561 (2022.01)
H04L 45/302 (2022.01)

(52) U.S. Cl.
CPC .......... *H04L 45/123* (2013.01); *H04L 45/302* (2013.01); *H04L 67/561* (2022.05)

(58) Field of Classification Search
CPC .... H04L 45/123; H04L 45/302; H04L 67/561
USPC ................... 709/238–239, 202–203
See application file for complete search history.

(56) References Cited

U.S. PATENT DOCUMENTS

| | | | |
|---|---|---|---|
| 9,288,182 B1 | 3/2016 | Ganguly et al. | |
| 10,148,493 B1* | 12/2018 | Ennis, Jr. | H04L 67/10 |
| 10,193,992 B2 | 1/2019 | Wagenknecht et al. | |
| 10,868,736 B2* | 12/2020 | Kottapalli | H04L 41/5054 |
| 10,999,407 B1* | 5/2021 | Thompson | H04L 67/561 |
| 2021/0037018 A1* | 2/2021 | Joyce | H04L 63/0209 |
| 2021/0234869 A1 | 7/2021 | Bondugula et al. | |
| 2021/0336788 A1* | 10/2021 | Ziegler | H04L 67/56 |
| 2022/0188170 A1* | 6/2022 | Smith | G06F 9/547 |

FOREIGN PATENT DOCUMENTS

| | | |
|---|---|---|
| CN | 105827687 A | 8/2016 |
| CN | 109672612 A | 4/2019 |
| CN | 110830459 A | 2/2020 |
| CN | 110225039 B | 10/2021 |

* cited by examiner

Primary Examiner — Bharat Barot
(74) Attorney, Agent, or Firm — Womble Bond Dickinson (US) LLP

(57) ABSTRACT

An application programming interface (API) gateway device receives an API request from a client device, the API gateway to provide access to a plurality of services provided by a plurality of compute nodes. A cluster manifest is created based on metadata associated with the API request and characteristics of the plurality of services, the cluster manifest identifying a logical view of a subset of the plurality of services provided by a subset of the plurality of compute nodes. The API request is routed to one of the subset of the plurality of services based on the cluster manifest.

15 Claims, 6 Drawing Sheets

… (1)

DYNAMIC API GATEWAY ROUTING BASED ON REQUEST METADATA

TECHNICAL FIELD

Aspects of the present disclosure relate to application programming interface (API) gateways and, more particularly, to API gateways capable of dynamically routing requests to particular services of a cluster based on metadata of the request.

BACKGROUND

Software deployments may utilize a cluster paradigm to have logical grouping of services and hardware. The services of the cluster may be provided, for example, by containerized applications running on logical compute nodes. The logical compute nodes may represent an execution engine that is running on a physical machine. An API gateway may provide a front end to the cluster. Incoming requests may be directed to the API gateway, and the API gateway may route the request to one or more of the services of the cluster. The API gateway may abstract the physical configuration of the services of the cluster from the client. Thus, a client accessing an API gateway may be ignorant of, and may indeed be unable to determine, the ultimate hardware that executes the client's query.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the scope of the described embodiments.

DETAILED DESCRIPTION

Figure 1:
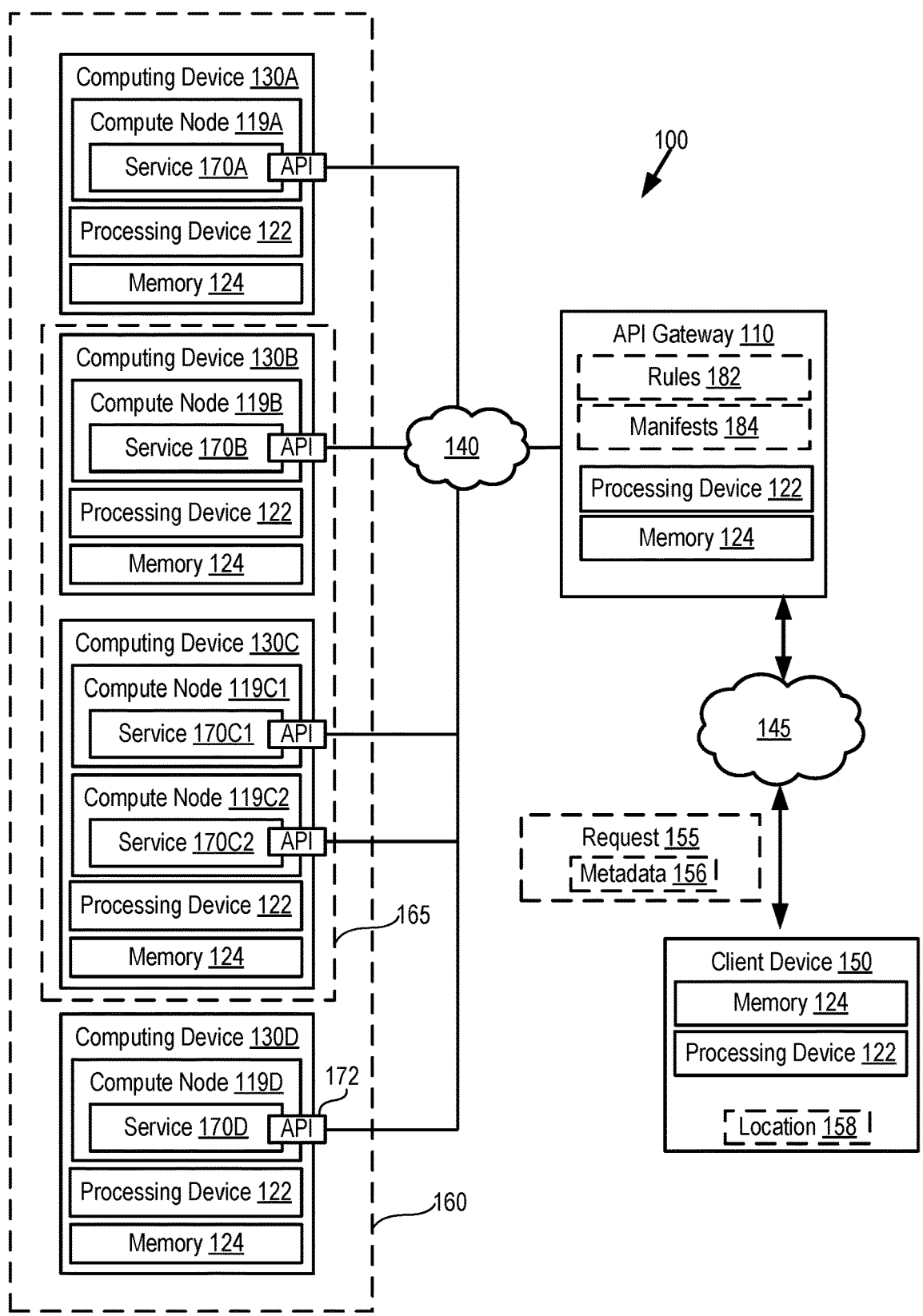
FIG. 1 is a block diagram that illustrates an example system, according to some embodiments of the present disclosure.

In computer systems supporting the development and execution of application services, virtual machines and/or containers may be used. As an example, a virtual machine ("VM") may be a robust simulation of an actual physical computer system utilizing a hypervisor to allocate physical resources to the virtual machine. As another example, containers are active components executing on an operating system of a host system that provide an environment for applications to run, while being isolated from any other components of the host system. Multiple containers may execute on a single operating system kernel and share the resources of the hardware upon which the operating system is running.

Container-based virtualization systems may be lighter weight than systems using virtual machines with hypervisors. Containers may allow widespread, parallel deployment of computing power for specific tasks. For example, a container may be instantiated to process a specific task and terminated after the task is complete. In large scale implementations, container orchestrators (e.g., Kubernetes®) may be used that manage the deployment and scheduling of large numbers of containers across multiple compute nodes. One example of a container orchestration platform is the Red Hat™ OpenShift™ platform built around Kubernetes.

Container orchestrators, as well as VM solutions, may employ cluster infrastructures. Cluster infrastructures may include a number of applications providing services (e.g., containers and/or VMs, also referred to as the data plane) and a control plane that manages the execution and/or distribution of the applications on one or more compute nodes of the cluster. In a cluster infrastructure for containers, the compute nodes, which may include physical hosts, processors on a physical host, or virtual machines, may be configured as resources for execution of the containers. The container orchestrators may move the containers between and among the compute nodes as part of managing the execution of the containers. The control plane of the cluster infrastructure may perform the scheduling and/or load balancing of the containers and/or VMs, and their associated applications, among the compute nodes.

In some cluster configurations, an API gateway may be used to abstract the implementation of the compute nodes of the cluster from clients utilizing the services of the cluster. The API gateway may serve as the front end of the cluster, and clients may direct their requests to the API gateway. The API gateway may route the request to one or more services of the cluster. The API gateway may therefore abstract the complexity of the cluster, as well as the dynamic creation and destruction of compute nodes, from the client.

However, the abstraction provided by the API gateway can hide details about the physical location (and underlying technology) of the compute nodes. This can cause complexity in configuring the cluster, because there can be real-world considerations that impact the types of services and/or technology that can be provided to particular users. For example, the General Data Protection Regulation (GDPR) of the European Union (EU) includes data sovereignty provisions that regulate where data can be stored. For example, some data sovereignty provisions may require that information collected and processed in a country must remain within the boundaries of that country and must adhere to the laws of that country. Thus, some data that may be generated by a service of a cluster in response to a client request may have limits on where the data can be stored/moved. In some cases, the limits may be based on information (e.g., metadata) of the client and/or the request. Similarly, some data regulations that govern a particular jurisdiction may be based on the type of data that is being created, accessed, and/or stored. For example, in some jurisdictions, medical information may have additional restrictions on where it can be moved. In a cluster environment in which new compute nodes are being spawned on a network that may span multiple geographies and/or countries, it can be quite complex to provide services to clients while still complying with local regulations.

The present disclosure addresses the above-noted and other deficiencies by providing a dynamic API gateway that may be deployed in a cluster. This API gateway may infer the geolocation of a client making a request and may form a logical view of what data and services that can be served to that geolocation. That logical view may be provided as a sub-cluster for that particular client. The API gateway may use this sub-cluster to query and interact with the logical subset of the master cluster that can service and handle the client request.

In some embodiments, the API gateway may request from each individual service within the sub-cluster their API (e.g., as a discovery process) and combine them into a singular API, providing a unified view of the capabilities of the sub-cluster. If new services and/or compute nodes that meet the criteria of the client are added (or services removed) the API gateway may adapt to this to always reflect and present to the client the menu of API actions they can take that are valid for their needs (or their location).

In some embodiments, the API gateway may extend a sub-cluster that does not currently have a service of a particular type available (but it is available in the wider cluster) by instantiating ancillary services to the sub-cluster. For example, ancillary services may include cryptography or authentication services. In some embodiments, the creation of the ancillary services may be driven by decomposing the client requests or inferring the service needs in advance to bring in services transiently in a just in time manner. In some embodiments, the API gateway may extend itself to become a policy based mechanism to subdivide the overall cluster into logically viewable zones. This could be an additional elasticity feature to create larger or more targeted zones to allow better scalability while controlling the attack vector.

In some embodiments, the API gateway may form its logical view of the sub-cluster based on the geolocation of the client and characteristics about the services that are available (e.g. the type of data provided by the service, a physical location of the compute node providing the service, a technology (e.g., cryptography) utilized by the service, etc.). However, the embodiments of the present disclosure are not limited to geolocation. In some embodiments, the API gateway may form its logical view of the sub-cluster, in part, based on metadata associated with the client request. For example, the metadata may include the geographic location of the client, the type of customer data, a traffic history of the client (e.g., with respect to the API gateway), a type of connection between the client and the API gateway (e.g., wireless or wired), and/or a bandwidth of the communication between the client and the API gateway.

Embodiments of the present disclosure may provide, at least, a technological solution that allows for automatic (e.g., without manual human intervention) configuration of the services provided by a cluster. The automatic configuration may limit or restrict accesses made by a client to those API services to which it is compatible, which may be determined, in part, based on metadata associated with the client request and characteristics of the services provided by the cluster.

FIG. 1 is a block diagram that illustrates an example system 100, according to some embodiments of the present disclosure. FIG. 1 and the other figures may use like reference numerals to identify like elements. A letter after a reference numeral, such as "130A," indicates that the text refers specifically to the element having that particular reference numeral. A reference numeral in the text without a following letter, such as "130," refers to any or all of the elements in the figures bearing that reference numeral.

As illustrated in FIG. 1, the system 100 includes an API gateway 110 (also referred to herein as an API gateway computing device 110 or API gateway device 110), and a plurality of node computing devices 130. In some embodiments, system 100 may include a cluster 160 (e.g., a container cluster 160), though the embodiments of the present disclosure are not limited to such a configuration. In FIG. 1, a first node computing device 130A, a second node computing device 130B, a third node computing device 130C, and a fourth node computing device 130D are illustrated as being part of the cluster 160, but the embodiments of the present disclosure are not limited to four node computing devices 130.

The API gateway computing device 110 and node computing devices 130 may be coupled to each other (e.g., may be operatively coupled, communicatively coupled, may communicate data/messages with each other) via network 140. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. In some embodiments, the network 140 may be an L3 network. The network 140 may carry communications (e.g., data, message, packets, frames, etc.) between the API gateway computing device 110 and the node computing devices 130.

The API gateway computing device 110 may be coupled (e.g., may be operatively coupled, communicatively coupled, may communicate data/messages with each other) to a client computing device 150 (also referred to herein as a client device 150) via network 145. Network 145 may be a public network (e.g., the internet), a private network (e.g., a local area network (LAN) or wide area network (WAN)), or a combination thereof. In one embodiment, network 145 may include a wired or a wireless infrastructure, which may be provided by one or more wireless communications systems, such as a WiFi™ hotspot connected with the network 145 and/or a wireless carrier system that can be implemented using various data processing equipment, communication towers (e.g. cell towers), etc. In some embodiments, the network 145 may be an L3 network. The network 145 may carry communications (e.g., data, message, packets, frames, etc.) between the API gateway 110 and the client computing device 150. In some embodiments, network 145 may be part of and/or connected to network 140, but the embodiments of the present disclosure are not limited to such a configuration. In some embodiments, network 145 may be separate and/or isolated from network 140. For example, in some embodiments, the API gateway 110 serves as a proxy and/or front end to the network 140 such that the client computing device 150 accesses the API gateway 110 in order to access the network 140 and/or node computing devices 130.

Each of the API gateway 110, the node computing devices 130, and the client computing device 150 (also collectively referred to herein as the "computing devices") may include hardware such as processing device 122 (e.g., processors, central processing units (CPUs), memory 124 (e.g., random access memory 124 (e.g., RAM), storage devices (e.g., hard-disk drive (HDD), solid-state drive (SSD), etc.), and other hardware devices (e.g., sound card, video card, etc.).

Processing device 122 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 122 may also include one or more special-purpose processing devices such as an application specific integrated circuit (ASIC), a field programmable gate array (FPGA), a digital signal processor (DSP), network processor, or the like.

Memory 124 may include volatile memory devices (e.g., random access memory (RAM)), non-volatile memory devices (e.g., flash memory) and/or other types of memory devices. In certain implementations, memory 124 may be non-uniform access (NUMA), such that memory access time depends on the memory location relative to processing device 122. In some embodiments, memory 124 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices. Memory 124 may be configured for long-term storage of data and may retain data between power on/off cycles of the computing devices 110, 130, 150.

Each of the computing devices 110, 130, 150 may comprise any suitable type of computing device or machine that has a programmable processor including, for example, server computers, desktop computers, laptop computers, tablet computers, smartphones, set-top boxes, etc. In some examples, each of the computing devices 110, 130, 150 may comprise a single machine or may include multiple interconnected machines (e.g., multiple servers configured in a cluster). The computing devices 110, 130, 150 may be implemented by a common entity/organization or may be implemented by different entities/organizations. For example, API gateway 110 may be operated by a first company/corporation and one or more of the node computing devices 130 may be operated by a second company/corporation.

An example deployment of the cluster 160 may include the API gateway 110 and a cluster of compute nodes 119. The compute nodes 119 may be arranged on respective ones of the node computing devices 130, and, in some embodiments, a node computing device 130 may host more than one compute node 119. For example, as illustrated in FIG. 1, a first compute node 119A may execute on the first node computing device 130A, a second compute node 119B may execute on the second node computing device 130B, third and fourth compute nodes 119C1 and 119C2 may execute on the third node computing device 130C, and a fifth compute node 119D may execute on the fourth node computing device 130D. The configuration illustrated in FIG. 1 is merely a schematic example intended to illustrate a sample configuration of node computing devices 130 and compute nodes 119, and is not intended to limit the embodiments of the present disclosure.

The compute nodes 119 may run (e.g., through use of the processing device 122 of the node computing device 130) services 170 that may include executable instruction code. For example, a compute node 119 may be a physical server that provides the processing capabilities required for running containers and/or VMs in the environment. A compute node 119 may also be implemented as a virtual server, logical container, or GPU, for example, that is running as part of a larger physical host. In the example of FIG. 1, the first compute node 119A provides service 170A, the second compute node 119B provides service 170B, the third compute node 119C1 provides service 170C1, the fourth compute node 119C2 provides service 170C2, and the fifth compute node 119D provides service 170D, but these are only example configurations for ease of description.

Each of the services 170 may expose (e.g., to network access) an API 172. The API 172 may be a programmatic interface configured to receive requests 155 (e.g., from client computing device 150) and provide access to service 170. A request 155 may be provided to the API 172 so as to access one or more computer resources provided by the service 170. The API 172 may provide a defined access mechanism for the service 170 for a particular compute node 119.

In some embodiments, operation of the cluster 160 may involve the execution of a plurality of the compute nodes 119. As new capacity is needed, new compute nodes 119 may be added to the cluster 160. When capacity is to be reduced, compute nodes 119 may be removed from the cluster 160. In some embodiments, adding new compute nodes 119 may include spawning new containers and/or VMs to execute a service 170. As new compute nodes 119 and/or services 170 are added (or deleted), the presence (or absence) of the service 170 is tracked by the API gateway 110 so that access to the services 170 can be maintained.

In some embodiments, the API gateway 110 serves as a front-end (e.g., a gateway) to the compute nodes 119. As new compute nodes 119 are added (or removed), the API gateway 110 keeps track of the services 170 that are added (or removed) as well as their associated APIs 172. For example, the API gateway 110 may perform discovery operations within the cluster 160 (e.g., over network 140) to determine which APIs 172 are available from which compute nodes 119.

As the front-end of the cluster 160, the API gateway 110 may be the point of access for requests 155 from a client computing device 150. For example, the client computing device 150 may send the request 155 to the API gateway 110 (e.g., over network 145). The client computing device, for example, may be unaware and/or unable to directly access the compute nodes 119. The API gateway 110 may examine the request 155 to determine one or more APIs 172 to which the request 155 should be forwarded. Upon determining the correct one or more APIs 172, the API gateway 110 may forward the request 155 (or a portion of the request 155) to the one or more APIs 172 of the associated service 170. The API gateway 110 also receives any response (e.g., a result) of the request 155 from the one or more APIs 172, and forwards the response to the client computing device 150.

As previously described, in some embodiments, it may be useful to isolate certain ones of the APIs 172 from the request 155 of the client computing device 150. For example, the API gateway 110 may determine that allowing the client computing device 150 to access certain ones of the APIs 172 may violate one or more rules 182 of the cluster 160. The rules 182 may correspond to regulations, laws, corporate preferences, service level agreements, or the like, that may regulate the storage, creation, and/or transfer of data to, from, and/or within the cluster 160. For example, the API gateway 110 may determine that a physical location 158 of the client computing device 150 is incompatible with one or more of the compute nodes 119 based on one of the rules 182 that limits data of the type generated or manipulated by the one or more compute nodes 119. In some embodiments, the API gateway 110 may determine that allowing the client computing device 150 to access one or more of the compute nodes 119 would violate the rules 182 based on a characteristic of the services 170 provided by the one or more compute nodes 119. As a non-limiting example, the API gateway 110 may determine that the location 158 of the client computing device 150 is within a first country while one or more of the services 170 of the compute nodes 119 is present (e.g., physically located) in a second country. The API gateway 110 may further determine according to the rules 182 that data generated in the second country is not to leave the second country. Thus, allowing the client computing device 150 to access the one or more services 170 in the second country may result in a violation of the rules 182.

In some embodiments, the API gateway 110 may generate a sub-cluster 165 that includes those services 170 that the client computing device 150 may access in accordance with the rules 182. In some embodiments, the generation of the sub-cluster 165 may be based on metadata 156 associated with a request 155 from the client computing device 150. In some embodiments, the metadata 156 may be a location 158 of the client computing device 150 included as part of the request 155.

In some embodiments, the location 158 may be inferred from the metadata 156 of the request 155. For example, known geolocation techniques may be utilized to determine the location 158 of the client computing device 150. Non-limiting methods for how to determine a geolocation from a request 155 include mapping an internet protocol (IP) address of the client computing device 150, accessing a location shared by the client computing device 150, and/or accessing a global positioning system (GPS) device (e.g., on the client computing device 150). Other methods of geolocation are contemplated.

Upon receipt of the metadata 156 (e.g., the location 158), the API gateway 110 may compare the metadata to the rules 182 as well as known characteristics of the services 170. Based on the comparison, the API gateway 110 may determine a subset of the services 170 (e.g., sub-cluster 165) that are available to the client computing device 150 to access, as well as their associated APIs 172. The sub-cluster 165 may be presented as a logical view of the cluster to which the client computing device 150 is restricted. In response to requests 155 from the client computing device 150 for the APIs 172 that are available, the API gateway 110 will return only those APIs 172 within the sub-cluster 165. APIs 172 and/or services 170 that are present on compute nodes 119 that are not part of the sub-cluster may not be made available to the client computing device 150 and/or advertised as available to the client computing device 150. In this way, access to the client computing device 150 may be restricted to only those services 170 and/or associated APIs 172 which are compliant with the rules 182.

The API gateway 110 may generate a cluster manifest 184 to maintain a configuration of the sub-cluster 165. In some embodiments, each client computing device 150 may be associated with at least one cluster manifest 184. The cluster manifest 184 may be, for example, a configuration file (or other data storage) that keeps track of which services 170 and/or compute nodes 119 are available to the client computing device 150 and a mapping to which APIs 172 are exported by those available services 170 and/or compute nodes 119. In some embodiments, as new compute nodes 119 and services 170 are added to the cluster 160, the API gateway 110 may determine if the new compute node 119 and/or service 170 should be added (or removed) from the sub-cluster 165, and update the cluster manifest 184 accordingly. In some embodiments, the client computing device 150 may be unable to access services 170 and/or APIs 172 that are not included in its associated cluster manifest 184.

In some embodiments, cluster manifests 184 may be maintained for different categories of client computing devices 150. For example, all client computing devices 150 sharing a same location 158 (e.g., within a same country) may get the same cluster manifest 184, though the embodiments of the present disclosure are not limited to such a configuration. In some embodiments, the cluster manifest 184 may be generated prior to access by the client computing device 150. For example, the API gateway 110 may pre-generate a cluster manifest 184 for each country from which the API gateway 110 expects access from a client computing device 150. When a request 155 is received, a location 158 of the client computing device 150 may be determined (e.g., from the metadata 156), and the appropriate cluster manifest 184 may be used.

In some embodiments, the cluster manifest 184 is generated not just based on the metadata 156, but also on characteristics of the services 170 of the cluster 160. For example, whether a client computing device 150 in a first country may access a service 170 in a second country depends both on the rules 182 associated with the first country (e.g., as determined by the client computing device 150) and the second country (e.g., as determined by the service 170 in question). As a non-limiting example, services 170 within the European Union (EU) may be capable of interacting with (e.g., sharing a sub-cluster 165 with) a client computing device 150 that is in another country that is also within the EU.

Though the previously-described examples have focused on the use of location 158 as a metadata 156 of a request 155 that may be used to generate a cluster manifest 184, the embodiments of the present disclosure are not limited thereto. In some embodiments, the metadata 156 may be other characteristics of the client computing device 150 and/or a user of the client computing device 150. Non limiting examples of metadata 156 include geolocation data, customer data, a traffic history of the client computing device 150, a type of connection between the client computing device 150 and the API gateway 110 (e.g., Bluetooth or Ethernet), and/or a bandwidth of the connection between the client computing device 150 and the API gateway 110 (e.g., a high-speed connection or a low-speed connection). As a non-limited example, the API gateway 110 may determine that metadata 156 of the request 155 indicates that the client computing device 150 is coupled to the API gateway 110 via Bluetooth. The API gateway 110 may generate a sub-cluster 165 (e.g., create a cluster manifest 184) made up of services 170 that have characteristics supporting lower data rates. Thus, the client computing device 150 may be isolated and/or restricted from those services 170 that are not part of its sub-cluster 165.

By using cluster manifest 184 to generate sub-clusters 165, the system architecture 100 allows for a clustering configuration that may dynamically maintain APIs 172 in compliance with rules 182. When geolocation is used as the metadata 156, this allows a global deployment paradigm that caters for strict geo-specific needs, allowing for subdivision of content and data based on regulatory needs, which may be expressed within the rules 182. This is dynamic and flexible to extend beyond just geographical considerations and allows the formation of client centric views into a sub-cluster 165.

In some embodiments, the API gateway 110 may maintain a minimum level of functionality within a sub-cluster 165 so as to ensure that the sub-cluster 165 offers the correct level of functionality for the client computing device 150. For example, the API gateway 110 may identify some services 170 and/or APIs 172 that should be present as part of the sub-cluster 165. Examples of services 170 and/or APIs 172 that may be considered as part of a minimum level of functionality for the sub-cluster 165 include logging services, authentication services, local data storage, coordination/deployment services, and the like. This list is merely an example, and it will be understood that other services 170 and/or APIs 172 may be considered as part of a minimum set of functionality for a sub-cluster 165 without deviating from the embodiments of the present disclosure.

When creating a sub-cluster 165, the API gateway 110 may attempt to ensure that the sub-cluster 165 includes each of those services 170 and/or APIs 172 that are deemed part of the minimal functioning set. When it is not possible to create such a sub-cluster 165 having the minimum set of functionality and still comply with the rules 182, the API gateway 110 may perform one or more types of remediation to augment the functionality of the sub-cluster 165.

Figure 2:
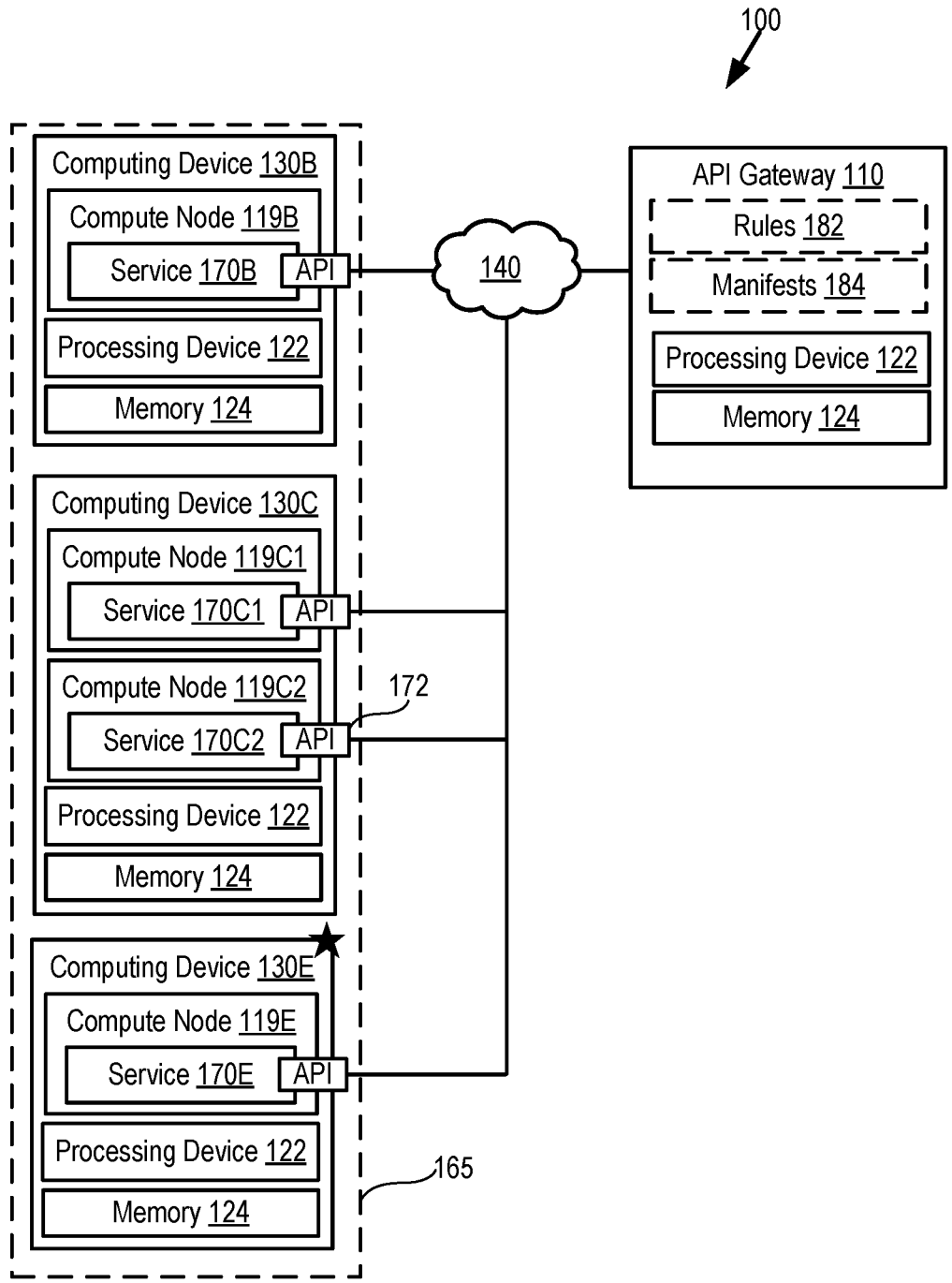
FIG. 2 is a block diagram that illustrates an example of remediating a sub-cluster to provide additional functionality, according to some embodiments of the present disclosure.

FIG. 2 is a block diagram that illustrates an example of remediating a sub-cluster 165 to provide additional functionality, according to some embodiments of the present disclosure. A description of elements of FIG. 2 that have been previously described will be omitted for brevity. In FIG. 2, only the sub-cluster 165 is illustrated, but it will be understood that the API gateway 110 may be in communication (e.g., over network 140) with one or more of the services 170 of the cluster 160 (see FIG. 1).

Referring to FIG. 2, the API gateway 110 of the system 100 may generate a sub-cluster 165. For example, the sub-cluster 165 may be generated in response to receiving a request 155 from a client computing device 150 (see FIG. 1) or in advance of receiving such a request 155. The API gateway 110 may examine the sub-cluster 165 to determine if the services 170 and/or APIs 172 of the sub-cluster 165 meet one or more of the rules 182 and are capable of providing a determined level of functionality. In response to determining that additional functionality is needed in the sub-cluster 165, the API gateway 110 may create (or request the creation of) an additional compute node 119E on a fifth node computing device 130E. The created additional compute node 119E is illustrated with a star in FIG. 2. The additional compute node 119E may execute an additional service 170E with an API 172 that provides access to one or more of the functionalities that was previously missing from the sub-cluster 165. The additional service 170E and its associated API 172 may be instantiated in such a way that it meets the conditions of the sub-cluster 165 (e.g., is in compliance with the rules 182). The additional service 170E and its associated API 172 may be added as part of the cluster manifest 184 that is associated with the sub-cluster 165.

In some embodiments, the API gateway 110 may bring up and/or activate the fifth node computing device 130E within a geographic region that is compatible with the rules 182 and the other node computing devices 130. For example, if the cluster manifest 184 associated with the sub-cluster 165 is configured to provide the sub-cluster 165 to be compatible with access from a first country, the fifth computing device 130E may be in a location that is compatible with access from the first country as well.

Though FIG. 2 illustrates the instantiation of an additional node computing device 130 to provide additional functionality, this is merely an example. In some embodiments, the additional functionality (e.g., an additional service 170) may be created by instantiating a new compute node 119 on one of the existing node computing devices 130. For example, a new container could be instantiated and/or a new VM could be instantiated on an existing node computing device 130 to provide the additional service 170E and its associated API 172.

Figure 3:
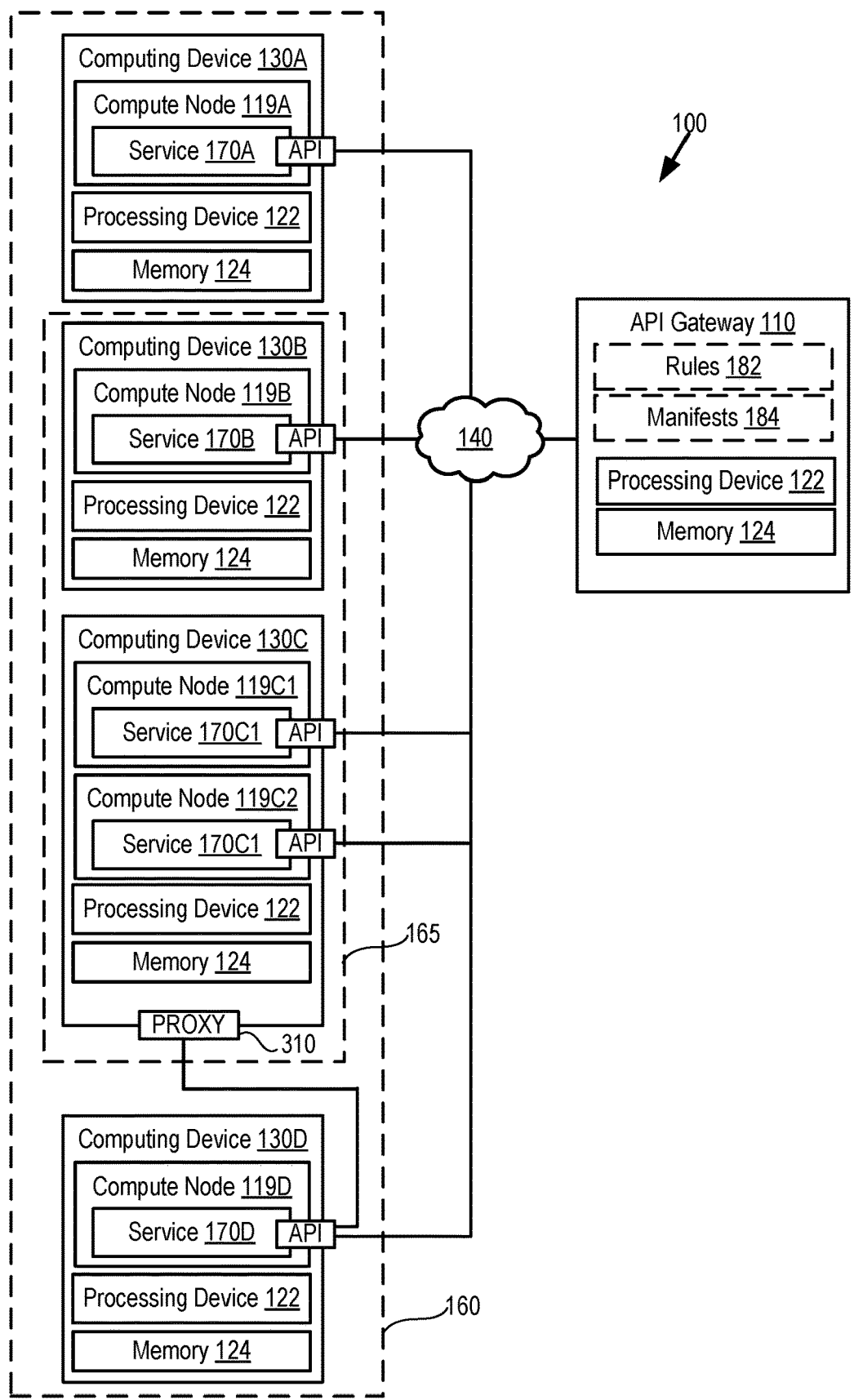
FIG. 3 is a block diagram that illustrates another example of remediating a sub-cluster to provide additional functionality, according to some embodiments of the present disclosure.

FIG. 3 is a block diagram that illustrates another example of remediating a sub-cluster 165 to provide additional functionality, according to some embodiments of the present disclosure. A description of elements of FIG. 3 that have been previously described will be omitted for brevity.

In some embodiments, the API gateway 110 may determine that an additional service 170 may be available within the cluster 160, but on a node computing device 130D that is not part of the sub-cluster 165. Referring to FIG. 3, in some embodiments, a node computing device 130 of the sub-cluster 165 may provide a proxy service to access services 170 that are outside the sub-cluster 165. For example, as illustrated in FIG. 3, the third node computing device 130C may provide a proxy 310 that communicates with the fourth node computing device 130D that is outside the sub-cluster 165 but within the cluster 160.

In such an embodiment, the service 170D of the fourth node computing device 130D that is being proxied (service 170D in FIG. 3) is not accessible directly from the API gateway 110. Instead, access to the service 170D is provided through the fourth node computing device 130D. When a request comes in for the service 170D provided by the fourth node computing device 130D, the API gateway 110 consults the cluster manifest 184 and routes the request to the third node computing device 130C. The third node computing device 130C forwards the request to the fourth node computing device 130D via proxy 310. The third node computing device 130C receives the results of the request from the fourth node computing device 130D via proxy 310 and returns the results to the API gateway 110. In this way, the functionality of the service 170D of the fourth node computing device 130D may be made available to the sub-cluster 165 without having to make the node computing device 130D part of the sub-cluster. Though FIG. 3 illustrates an example in which the proxy 310 is between node computing devices 130, the embodiments of the present disclosure are not limited to such a configuration. In some embodiments, the proxy 310 may be formed between a compute node 119 within the sub-cluster 165 and a compute node 119 that is outside the sub-cluster 165 (e.g., but within the cluster 160).

The configuration illustrated in FIG. 3 may be useful with the functionality provided by the compute node 119 outside the sub-cluster 165 is otherwise in compliance with the rules 182, but the compute node 119 may not be added to the sub-cluster for some other reasons (e.g., other compute nodes 119 and/or services 170 executing on the node computing device 130 or other reason). In some embodiments, to facilitate the proxy 310, the third node computing device 130C may generate a dedicated compute node 119 (not shown in FIG. 3) to provide an additional service 170 to handle the proxy requests, though the embodiments of the present disclosure are not limited thereto.

Figure 4:
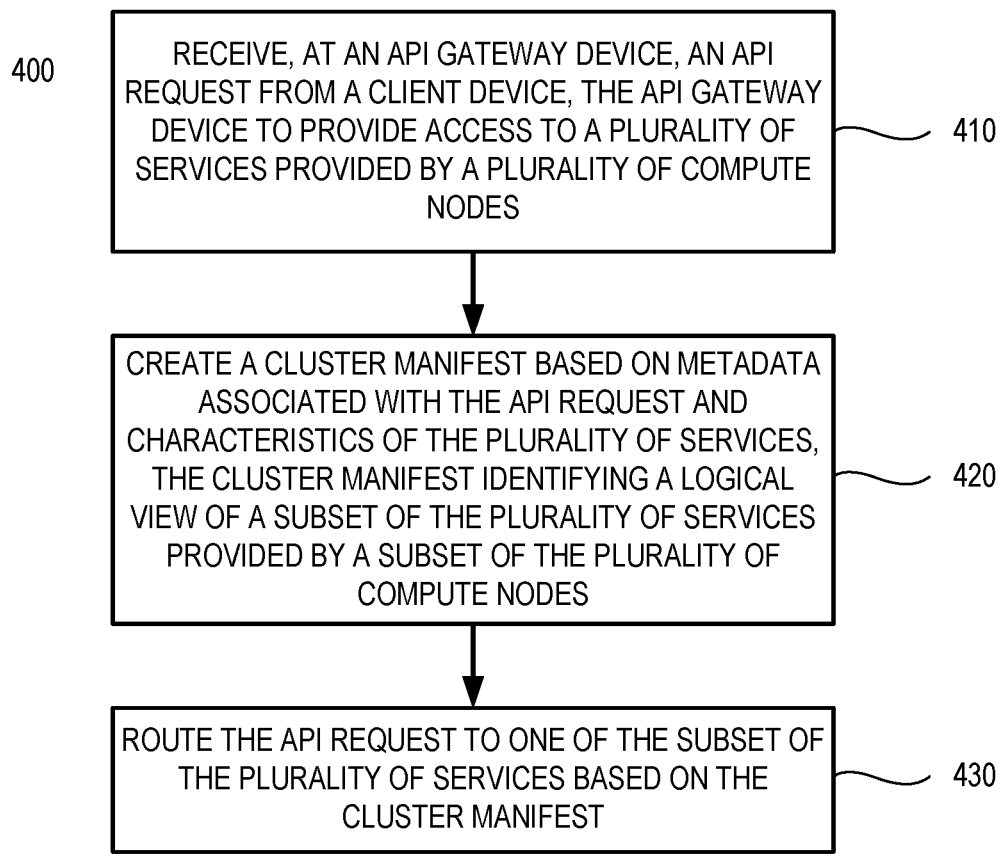
FIG. 4 is a flow diagram of a method for scheduling a software container, in accordance with some embodiments of the present disclosure

FIG. 4 is a flow diagram of a method 400 for scheduling a software container, in accordance with some embodiments of the present disclosure. Method 400 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, the method 400 may be performed by a computing device (e.g., API gateway computing device 110 illustrated in FIGS. 1 to 3).

With reference to FIG. 4, method 400 illustrates example functions used by various embodiments. Although specific function blocks ("blocks") are disclosed in method 400, such blocks are examples. That is, embodiments are well suited to performing various other blocks or variations of the blocks recited in method 400. It is appreciated that the blocks in method 400 may be performed in an order different than presented, and that not all of the blocks in method 400 may be performed.

Referring simultaneously to FIGS. 1 to 3 as well, the method 400 begins at block 410, an API gateway device 110 receives an API request 155 from a client computing device 150, the API gateway device 110 to provide access to a plurality of services 170 provided by a plurality of compute nodes 119. In some embodiments, the compute nodes 119 may be associated with and/or execute on a computing device similar to node computing device 130, as described herein with respect to FIGS. 1 to 3.

At block 420, a cluster manifest 184 is created (e.g., by a processing device 122) based on metadata 156 associated with the API request 155 and characteristics of the plurality of services 170, the cluster manifest 184 identifying a logical view of a subset of the plurality of services 170 provided by a subset of the plurality of compute nodes 119. In some embodiments, the plurality of services may be similar to the cluster 160 and the subset of the plurality of services 170 may be similar to sub-cluster 165, as described herein with respect to FIGS. 1 to 3.

In some embodiments, the metadata 156 includes at least one of a location 158 of the client computing device 150, traffic history of the client computing device 150, a type of connection between the client computing device 150 and the API gateway device 110, and/or bandwidth of a network connection 145 between the client computing device 150 and the API gateway device 110.

In some embodiments, the characteristics of the plurality of services 170 include at least one of a location (e.g., a physical location) of a compute node 119 of the plurality of compute nodes 119 that is associated with the service 170, a location (e.g., a physical location) of data stored by the service 170, or a type of cryptography utilized by the service 170.

In some embodiments, the metadata 156 includes the location 158 of the client computing device 150 and the characteristics of the plurality of services 170 comprise a physical location of stored data of respective ones of the plurality of services 170.

At block 430, the API request 155 is routed to one of the subset of the plurality of services 170 based on the cluster manifest 184. In some embodiments, the API request 155 may be routed to an API 172 provided by the one of the subset of the plurality of services 170, as described herein with respect to FIGS. 1 to 3. In some embodiments, the method 400 further includes, restricting access of the client device 150 from ones of the plurality of services 170 that are not in the subset of the plurality of services 170.

In some embodiments, the method 400 further includes, responsive to the subset of the plurality of services 170 failing to meet a threshold level of functionality, instantiating an additional service 170 within the plurality of services 170 and adding the additional service 170 to the subset of the plurality of services. In some embodiments, instantiating the additional service 170 may include the creation of a software container or VM, as described herein with respect to FIGS. 1 to 3.

In some embodiments, the method 400 further includes, responsive to the subset of the plurality of services 170 failing to meet a threshold level of functionality, generating a proxy 310 on a compute node 119 of the subset of the plurality of compute nodes 119, the proxy 310 to connect to a compute node 119 of the plurality of compute nodes 119 that is not within the subset of the plurality of compute nodes 119. The creation of the proxy 310 may be similar to the creation of the proxy 310 between a compute node 119 within the sub-cluster 165 and a compute node 119 that is outside of the sub-cluster 165, as discussed herein with respect to FIG. 3.

Figure 5:
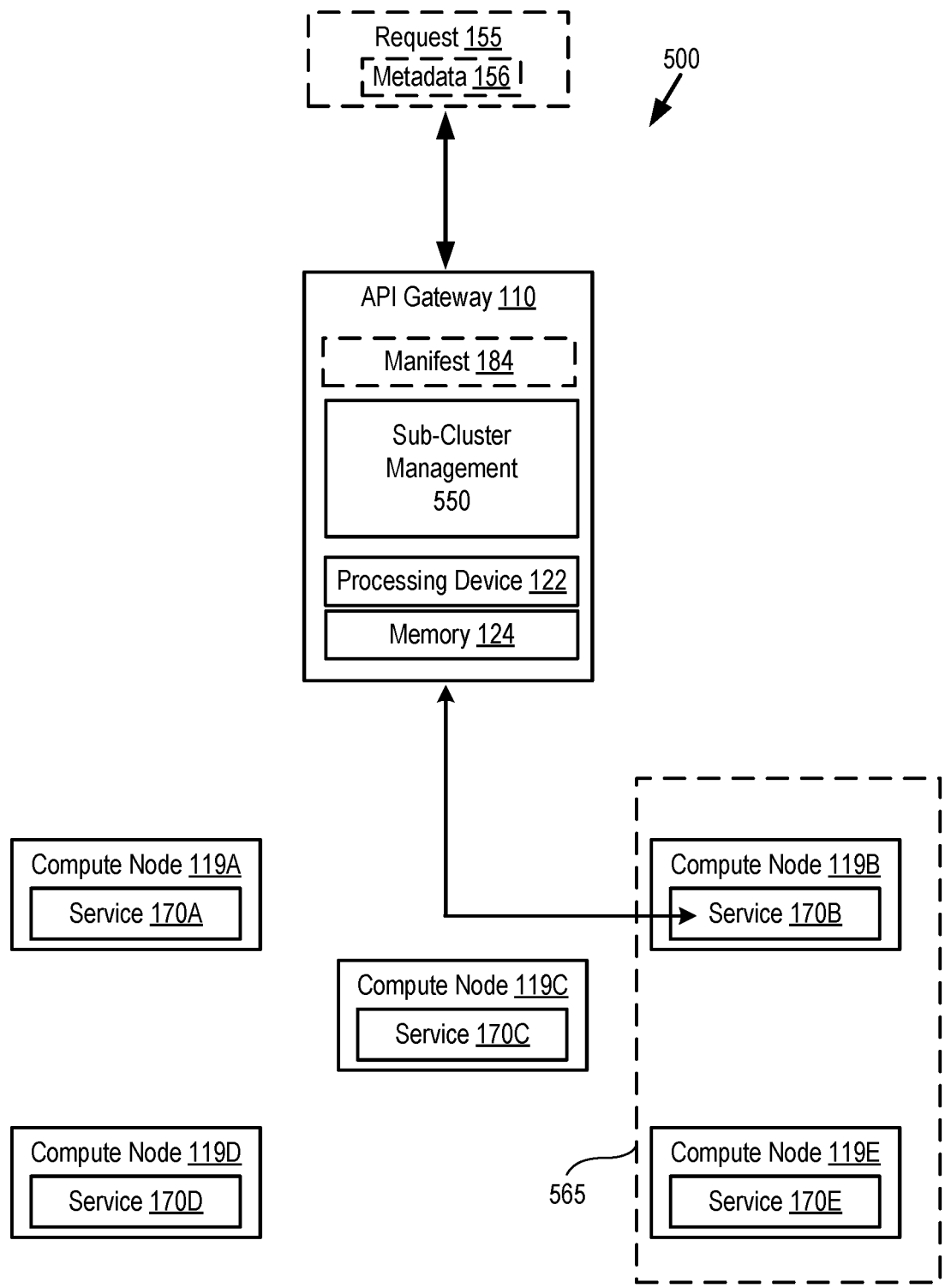
FIG. 5 is a component diagram of an example of a device architecture, in accordance with embodiments of the disclosure.

FIG. 5 is a component diagram of an example of a device architecture 500, in accordance with embodiments of the disclosure. The device architecture 500 includes API gateway device 110 having processing device 122 and memory 124, as described herein with respect to FIGS. 1 to 4.

The API gateway device 110 may receive an API request 155. The API request 155 may be provided, for example, from a client device such as client computing device 150 described herein with respect to FIGS. 1 to 4. The API gateway device 110 may be configured to provide access to a plurality of services 170 provided by a plurality of compute node 119. The plurality of compute nodes 119 may be part of a node computing device such as node computing device 130 described herein with respect to FIGS. 1 to 4.

The API gateway device 110 may be configured to perform sub-cluster management 550 as described herein with respect to FIGS. 1 to 4. For example, the API gateway device 110 may create a cluster manifest 184 based on metadata 156 associated with the API request 155 and characteristics of the plurality of services 170. The cluster manifest 184 may identify a logical view of a subset 565 of the plurality of services 170 provided by a subset of the plurality of compute nodes 119. In some embodiments, the subset 565 of the plurality of services 170 may be similar to the sub-cluster 165 described herein with respect to FIGS. 1 to 4. In some embodiments, the subset 565 of the plurality of services 170 may be fewer than all of the plurality of services 170.

The API gateway 110 may route the API request 155 to one of the subset of the plurality of services 170 based on the cluster manifest 184. Routing the API request 155 may be performed according to the techniques for communicating with services 170 of a sub-cluster 165 described herein with respect to FIGS. 1 to 4.

The device architecture 500 of FIG. 5 provides a technological capability to dynamically generate sub-clusters within a group of provided services that are compliant with given rules that may govern the physical configuration of the compute nodes that are executing the services. The API gateway 110 may be capable of automatically adjusting the configuration to adapt for the creation and deletion of compute nodes. Similarly, the API gateway 110 may be able to maintain a minimum functionality of the generated sub-cluster such that compliance with the rules does not generate a sub-cluster that is non-functional or otherwise deficient. Beyond compliance with a set of rules, the device architecture 500 may allow for the creation of sub-clusters that are capable of adapting to particular metadata associated with a client request, and generating a logical view of services that include characteristics that are compatible (e.g., in compliance with) with that metadata.

Figure 6:
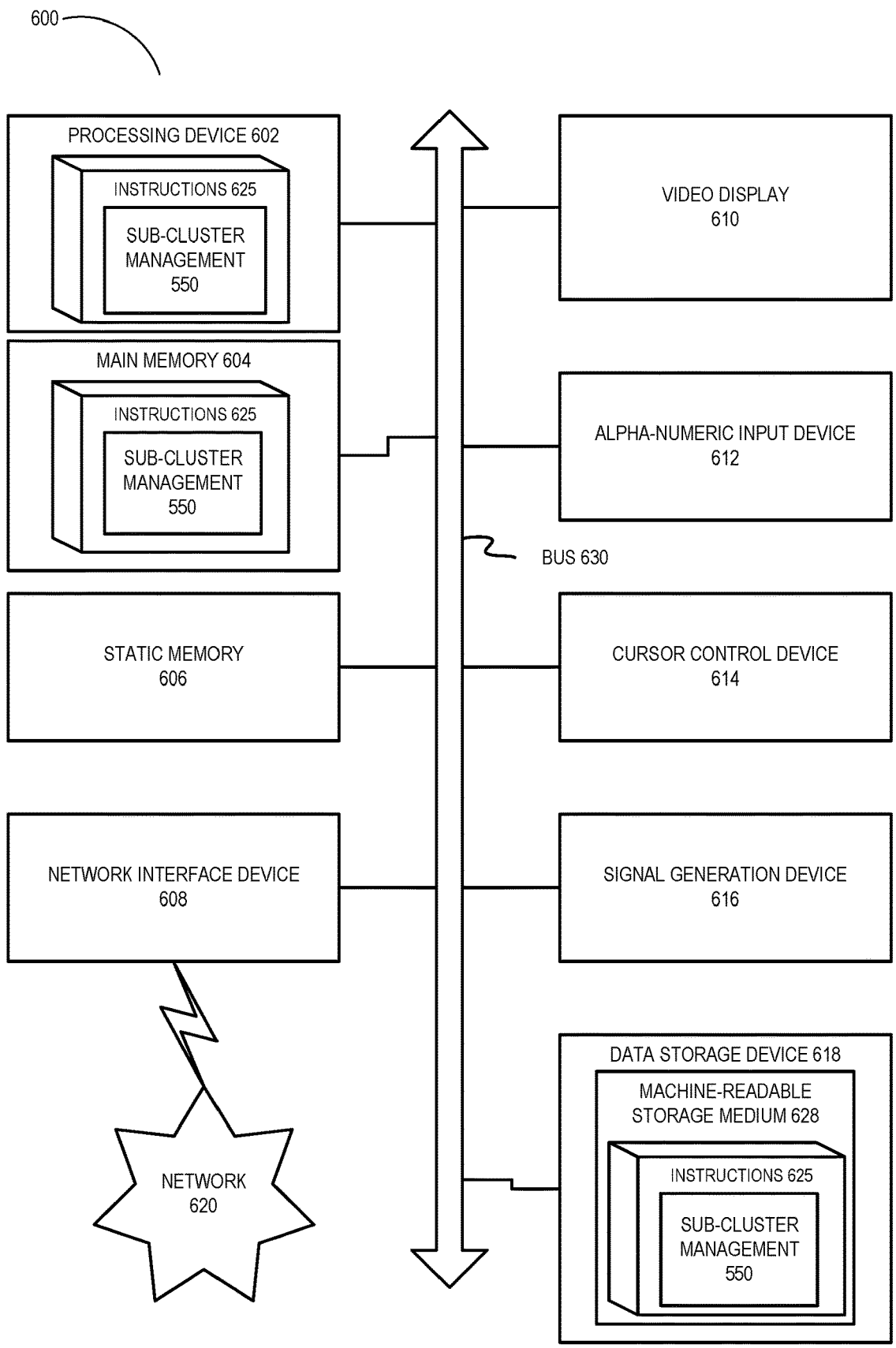
FIG. 6 is a block diagram that illustrates an example system, according to some embodiments of the present disclosure.

FIG. 6 is a block diagram of an example computing device 600 that may perform one or more of the operations described herein, in accordance with some embodiments of the disclosure. Computing device 600 may be connected to other computing devices in a LAN, an intranet, an extranet, and/or the Internet. The computing device may operate in the capacity of a server machine in client-server network environment or in the capacity of a client in a peer-to-peer network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods discussed herein.

The example computing device 600 may include a processing device (e.g., a general purpose processor, a PLD, etc.) 602, a main memory 604 (e.g., synchronous dynamic random access memory (DRAM), read-only memory (ROM)), a static memory 606 (e.g., flash memory and a data storage device 618), which may communicate with each other via a bus 630.

Processing device 602 may be provided by one or more general-purpose processing devices such as a microprocessor, central processing unit, or the like. In an illustrative example, processing device 602 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 602 may also include one or more special-purpose processing devices such as an application specific integrated circuit (ASIC), a field programmable gate array (FPGA), a digital signal processor (DSP), network processor, or the like. The processing device 602 may execute the operations described herein, in accordance with one or more aspects of the present disclosure, for performing the operations and steps discussed herein.

Computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and an acoustic signal generation device 616 (e.g., a speaker). In one embodiment, video display unit 610, alphanumeric input device 612, and cursor control device 614 may be combined into a single component or device (e.g., an LCD touch screen).

Data storage device 618 may include a computer-readable storage medium 628 on which may be stored one or more sets of instructions 625 that may include instructions for a component (e.g., sub-cluster management 550, including, but not limited to, operations performed by API gateway device 110 discussed herein) for carrying out the operations described herein, in accordance with one or more aspects of the present disclosure. Instructions 625 may also reside, completely or at least partially, within main memory 604 and/or within processing device 602 during execution thereof by computing device 600, main memory 604 and processing device 602 also constituting computer-readable media. The instructions 625 may further be transmitted or received over a network 620 via network interface device 608.

While computer-readable storage medium 628 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "receiving," "creating," "routing," "instantiating," "restricting," "generating," or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc., as used herein are meant as labels to distinguish among different elements and may not necessarily have an ordinal meaning according to their numerical designation.

Examples described herein also relate to an apparatus for performing the operations described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combination of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method comprising:
    receiving, at an application programming interface (API) gateway device, an API request from a client device, the API gateway device to provide access to a plurality of services provided by a plurality of compute nodes;
    creating, by a processing device, a cluster manifest based on metadata associated with the API request and characteristics of the plurality of services, the cluster manifest identifying a logical view of a subset of the plurality of services provided by a subset of the plurality of compute nodes, wherein the metadata comprises an indication of a physical location of the client device, and wherein the characteristics of the plurality of services upon which the cluster manifest is based comprise at least one of a physical location of a compute node of the plurality of compute nodes that is associated with respective ones of the plurality of services, a physical location of data stored by the respective ones of the plurality of services, or a type of cryptography utilized by the service; and
    routing the API request to one of the subset of the plurality of services based on the cluster manifest.

2. The method of claim 1, further comprising:
    responsive to the subset of the plurality of services included in the cluster manifest failing to meet a threshold level of functionality, instantiating an additional service within the plurality of services and adding the additional service to the subset of the plurality of services included in the cluster manifest.

3. The method of claim 1, wherein the metadata further comprises at least one of traffic history of the client device, a type of connection between the client device and the API gateway device, or bandwidth of a network connection between the client device and the API gateway device.

4. The method of claim 1, further comprising restricting access of the client device from ones of the plurality of services that are not in the subset of the plurality of services.

5. The method of claim 1, further comprising:
    responsive to the subset of the plurality of services included in the cluster manifest failing to meet a threshold level of functionality, generating a proxy on a compute node of the subset of the plurality of compute nodes, the proxy to connect to a compute node of the plurality of compute nodes that is not within the subset of the plurality of compute nodes.

6. A system comprising:
    a memory; and
    a processing device, operatively coupled to the memory, to:
        receive, at an application programming interface (API) gateway device, an API request from a client device, the API gateway device to provide access to a plurality of services provided by a plurality of compute nodes;
        create a cluster manifest based on metadata associated with the API request and characteristics of the plurality of services, the cluster manifest identifying a logical view of a subset of the plurality of services provided by a subset of the plurality of compute nodes, wherein the metadata comprises an indication of a physical location of the client device, and wherein the characteristics of the plurality of services upon which the cluster manifest is based comprise at least one of a physical location of a compute node of the plurality of compute nodes that is associated with respective ones of the plurality of services, a physical location of data stored by the respective ones of the plurality of services, or a type of cryptography utilized by the service; and
        route the API request to one of the subset of the plurality of services based on the cluster manifest.

7. The system of claim 6, wherein the processing device is further to:
    responsive to the subset of the plurality of services included in the cluster manifest failing to meet a threshold level of functionality, instantiate an additional service within the plurality of services and adding the additional service to the subset of the plurality of services included in the cluster manifest.

8. The system of claim 6, wherein the metadata further comprises at least one of traffic history of the client device, a type of connection between the client device and the API gateway device, or bandwidth of a network connection between the client device and the API gateway device.

9. The system of claim 6, wherein the processing device is further to restrict access of the client device from ones of the plurality of services that are not in the subset of the plurality of services.

10. The system of claim 6, wherein the processing device is further to:
responsive to the subset of the plurality of services included in the cluster manifest failing to meet a threshold level of functionality, generate a proxy on a compute node of the subset of the plurality of compute nodes, the proxy to connect to a compute node of the plurality of compute nodes that is not within the subset of the plurality of compute nodes.

11. A non-transitory computer-readable storage medium including instructions that, when executed by a processing device, cause the processing device to:
receive, at an application programming interface (API) gateway device, an API request from a client device, the API gateway device to provide access to a plurality of services provided by a plurality of compute nodes;
create, by a processing device, a cluster manifest based on metadata associated with the API request and characteristics of the plurality of services, the cluster manifest identifying a logical view of a subset of the plurality of services provided by a subset of the plurality of compute nodes, wherein the metadata comprises an indication of a physical location of the client device, and wherein the characteristics of the plurality of services upon which the cluster manifest is based comprise at least one of a physical location of a compute node of the plurality of compute nodes that is associated with respective ones of the plurality of services, a physical location of data stored by the respective ones of the plurality of services, or a type of cryptography utilized by the service; and
route the API request to one of the subset of the plurality of services based on the cluster manifest.

12. The non-transitory computer-readable storage medium of claim 11, wherein the processing device is further to:
responsive to the subset of the plurality of services included in the cluster manifest failing to meet a threshold level of functionality, instantiate an additional service within the plurality of services and adding the additional service to the subset of the plurality of services included in the cluster manifest.

13. The non-transitory computer-readable storage medium of claim 11, wherein the metadata further comprises at least one of traffic history of the client device, a type of connection between the client device and the API gateway device, or bandwidth of a network connection between the client device and the API gateway device.

14. The non-transitory computer-readable storage medium of claim 11, wherein the processing device is further to restrict access of the client device from ones of the plurality of services that are not in the subset of the plurality of services.

15. The non-transitory computer-readable storage medium of claim 11, wherein the processing device is further to:
responsive to the subset of the plurality of services included in the cluster manifest failing to meet a threshold level of functionality, generate a proxy on a compute node of the subset of the plurality of compute nodes, the proxy to connect to a compute node of the plurality of compute nodes that is not within the subset of the plurality of compute nodes.

\* \* \* \* \*